UNITED STATES PATENT OFFICE.

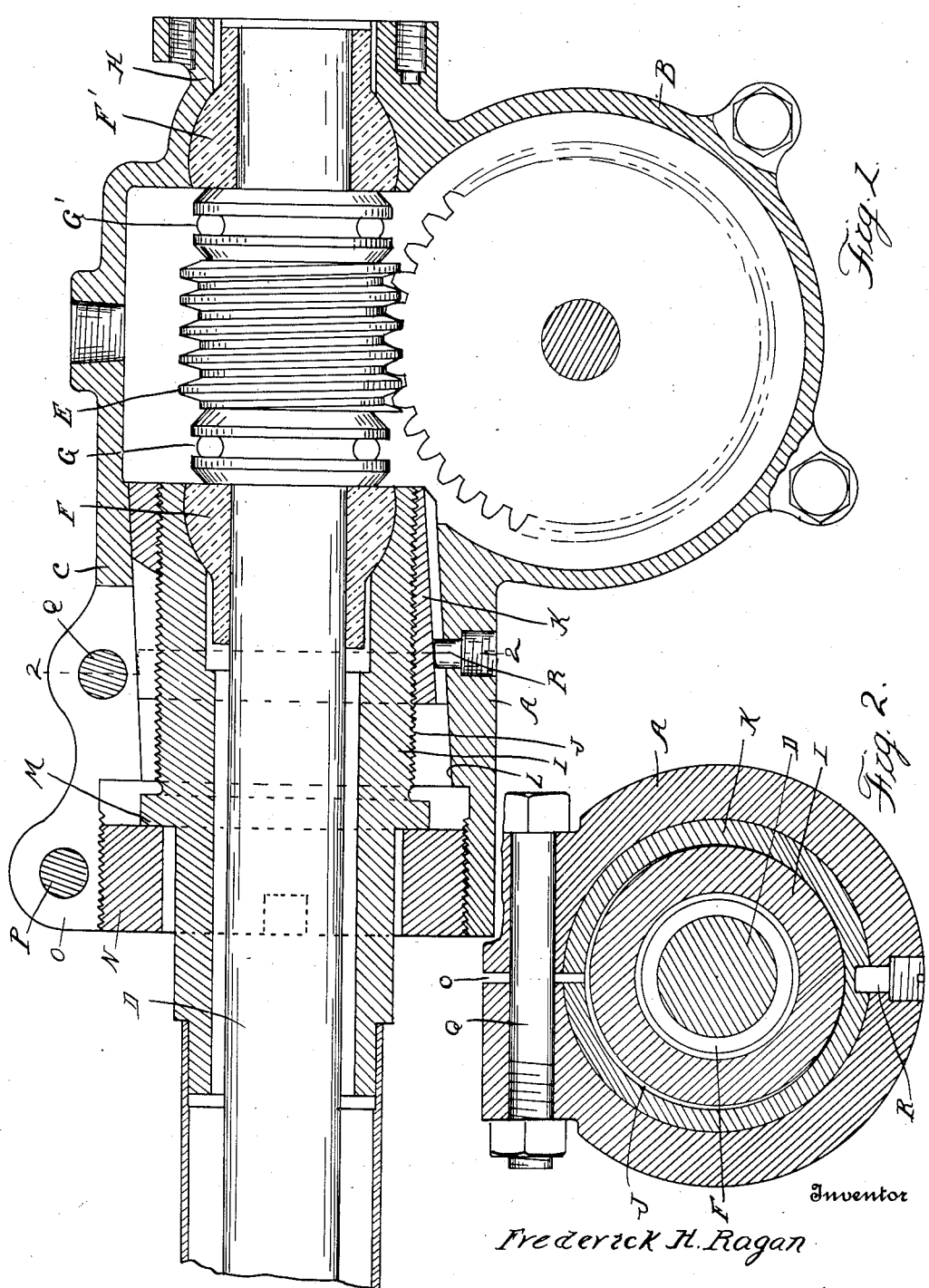

FREDERICK H. RAGAN, OF DETROIT, MICHIGAN, ASSIGNOR TO GEMMER MANUFACTURING COMPANY, OF DETROIT, MICHIGAN, A CORPORATION OF MICHIGAN.

STEERING-GEAR.

1,344,005.

Specification of Letters Patent.

Patented June 22, 1920.

Application filed August 30, 1919. Serial No. 320,757.

*To all whom it may concern:*

Be it known that I, FREDERICK H. RAGAN, a citizen of the United States of America, residing at Detroit, in the county of Wayne and State of Michigan, have invented certain new and useful Improvements in Steering-Gears, of which the following is a specification, reference being had therein to the accompanying drawings.

The invention relates to worm gearing and more particularly to steering gears of that type in which the rotation of the steering stem is transmitted to the rocker arm through the medium of worm gearing. In the design of steering gears it is desirable to obtain simplicity of construction. Therefore, with certain types of gears the worm wheels are mounted in a single integral cast housing, the axes of the bearings being located a fixed distance from each other. It has been found, however, that in large production it is impossible to hold dimensions very close. As a consequence, both the worm and worm gears vary slightly in size and there is also a variation in the distance between the bearings in the housings. It has been the practice heretofore to match up the gears and worms with housings so as to secure a better meshing. This involves time and labor as well as a frequent scrapping of parts which are outside the limits of permissible variation.

With other constructions of steering gears adjustment is provided for the bearing of the worm with respect to the bearing of the worm gear, but with such constructions the adjustable bearing is at one end of the wheel only. This has the obvious objection that the lateral thrust of the worm gear against the worm is resistant only by a single bearing offset from the line of thrust.

It is the object of the present invention to obtain a simple construction of steering gear in which there are bearings for the wheel on opposite ends thereof and at the same time there is provision for a lateral adjustment of the worm with respect to the gear. To this end I have devised a construction in which one of the bearings for the worm shaft is substantially fixed, while the other is laterally adjustable. I have further devised a simple means of adjustment which may be operated after the complete assembly of the gear.

In the drawings:

Figure 1 is a longitudinal section through the gear;

Fig. 2 is a cross-section on line 2—2 of Fig. 1.

A is the housing which has a portion B for inclosing the worm gear and a portion C for receiving the steering stem D and the worm E thereon. The steering stem is supported by bearings F and F' at opposite ends of the worm and anti-friction end thrust bearings G and G' are arranged between the worm and the bearings F and F'.

The bearing F' is formed in a bushing which has a spherical outer face engaging a spherical socket portion H of the housing A. The bearing F is also formed in a bushing with a similar spherical outer portion, but instead of directly engaging the outer housing, this bushing is seated in a tubular member I. The latter is externally threaded as indicated at J, and engages an internally threaded bushing K arranged between the same and the outer casing A. The inner surface of the bushing K is concentric with the axis of the stem D, but the outer face, which is cylindrical, is concentric with an axis slightly inclined to the axis of the stem D and engages a similarly inclined cylindrical socket in the member A, as indicated at L. M is a shoulder on the member I which is engaged by an adjustable collar N having a threaded engagement with the casing A. This collar is locked in different positions of adjustment by splitting the outer casing, as indicated at O, and by providing a clamping bolt P. A similar locking device for the bushing K is formed by the bolt Q. R is a spline engaging a slot in the bushing K and holding the same from rotation while permitting longitudinal adjustment.

With the construction as described the various elements of the structure are first assembled and after assembly are adjusted in the following manner: The member I is turned and by its threaded engagement with with the collar K, which is held from rotation by the spline R, will adjust said bushing longitudinally of the housing A. This longitudinal adjustment will in turn produce a lateral adjustment, due to the fact that the axis of the external surface of the bushing is inclined to the axis of its internal surface which is concentric with the axis of the stem D. Consequently, the portion of the stem D which passes through the bearing F will be moved laterally by this adjustment, thereby moving the worm E toward or from the worm gear B. Such adjustment is permitted without cramping the shaft in the bearings as the bushings F and F' have spherical outer surfaces which are universally pivotal in the spherical sockets. After the worm is properly meshed with the worm gear, the collar N, which forms an end thrust bearing for the shoulder M, is locked by the clamping bolt P, while the bolt Q is tightened to similarly lock the bushing K. In case of wear end play can be taken up by adjustment of the collar N and back-lash between the teeth of the worm and gear can be taken up by adjustment of the bushing K.

My improved construction is particularly valuable in that it simplifies and cheapens the cost of production by eliminating careful selection and avoids the scrapping of many parts. It is also useful as a means of taking up wear, while the construction is as simple to manufacture as structures unprovided with such adjustments.

What I claim as my invention is:

1. In a steering gear, the combination with a steering shaft, a rocker shaft, intermeshing gearing connecting said steering shaft with said rocker shaft, and a housing in which said shafts are journaled, of a bearing for the steering stem at one end of the gear thereon permitting a pivotal movement, and a bearing on said stem on the opposite end of the gear laterally adjustable to move said gear toward or from the intermeshing gear.

2. In a steering gear, the combination with a housing, a steering stem and rocker shaft journaled therein, and intermeshing gears upon said shafts, of a bearing for said steering stem at one end of the gear thereon pivotally engaging the housing, a bearing on said stem at the opposite end of the gear, and a bushing between the latter bearing and housing adjustable to produce a lateral deflection of said bearing.

3. In a steering gear, the combination with a housing, a steering stem and rocker shaft journaled therein and intermeshing worm gearing connecting the same, of a bearing for said steering stem at one end of said gearing permitting a pivotal movement in the housing, a bearing for said stem on the opposite end of the gearing, a bushing surrounding the latter bearing having its internal and external surfaces respectively concentric with axes inclined in relation to each other, means for holding said bushing from rotation, and means for adjusting the bushing longitudinally to effect a lateral displacement of the bearing.

4. In a steering gear, the combination with a housing, of intermeshing gears therein, a shaft on which one of said gears is mounted, a bearing for said shaft, a bushing between said shaft bearing and housing having outer and inner surfaces respectively concentric with longitudinal axes which are at an angle to each other, and means for adjusting said bushing longitudinally to effect a lateral movement of said bearing.

5. In a steering gear, the combination with a housing, intermeshing gears therein and a shaft on which one of said gears is mounted, of a bearing for said shaft, a rotative member surrounding said bearing and forming a seat therefor, a bushing surrounding said rotative member and between the same and said housing, said bushing having outer and inner surfaces respectively concentric with longitudinal axes which are at an angle to each other, the inner surface having a rigid engagement with said rotative member, and means for holding said bushing from rotative movement while permitting longitudinal movement thereof, whereby the rotation of said rotative member will cause the longitudinal movement of said bushing and the lateral deflection of said bearing.

6. In a steering gear, the combination with a housing and intermeshing gears therein, of a shaft on which one of said gears is mounted, a bearing on said shaft for receiving both radial and end thrust, a member surrounding said shaft and bearing in which the latter is seated, said member extending out from the end of said housing, an end thrust bearing for said member, a bushing between said member and said housing having a threaded engagement with the former and having a bearing on the latter which is at an angle to the longitudinal axis of said shaft and member, and means for holding said bushing from rotative movement while permitting longitudinal movement thereof, whereby the rotation of said member will cause the longitudinal adjustment of said bushing and the lateral deflection of said member, bearing and shaft.

7. In a steering gear, the combination with a housing, of intermeshing gears therein, a shaft on which one of said gears is mounted, a bearing for said shaft adapted to receive both radial and end thrust, a member carrying said bearing surrounding said shaft and extending outward from said housing, said member being rotatively adjustable, a thrust bearing on said housing for said member, a bushing surrounding said member having a threaded engagement therewith, its outer surface being at an angle to the axis of said member and shaft, and means for holding said bushing from rotative movement while permitting longitudinal movement thereof.

8. In a steering gear, the combination with a housing, of intermeshing gears journaled therein, a shaft on which one of said gears is mounted, bearings for said shaft at opposite ends of the gear thereon, said bearings each being adapted to receive radial and end thrust, pivotal seats for said bearings, a member in which one of said seats is formed surrounding said shaft and extending out from said casing, said member being rotatively adjustable, a thrust bearing for said member adjustable in said housing, a bushing surrounding said rotative member having a threaded engagement therewith, and a bearing in said housing which is at an angle to the longitudinal axis of the shaft, and means for holding said bushing from rotative movement while permitting longitudinal movement thereof.

In testimony whereof I affix my signature.

FREDERICK H. RAGAN.